(12) United States Patent
Goodrum et al.

(10) Patent No.: US 9,318,896 B2
(45) Date of Patent: Apr. 19, 2016

(54) FAULT-TOLERANT POWER CONTROL IN A COMPUTER SYSTEM

(71) Applicant: Hewlett-Packard Development Company, L.P., Houston, TX (US)

(72) Inventors: Alan L. Goodrum, Tomball, TX (US); Clifford A. McCarthy, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 795 days.

(21) Appl. No.: 13/628,791

(22) Filed: Sep. 27, 2012

(65) Prior Publication Data
US 2014/0084683 A1    Mar. 27, 2014

(51) Int. Cl.
*H02J 4/00* (2006.01)
*H02J 5/00* (2006.01)
*H02J 1/10* (2006.01)

(52) U.S. Cl.
CPC .. *H02J 5/00* (2013.01); *H02J 1/102* (2013.01); Y10T 307/305 (2015.04)

(58) Field of Classification Search
CPC ............... H02J 1/10; H02J 9/061; H02J 5/00; H02J 1/102; G06F 1/26; H02M 7/064; H02M 2001/009; Y10T 307/305
USPC .......................................................... 307/18
See application file for complete search history.

(56) References Cited

U.S. PATENT DOCUMENTS

| | | | | |
|---|---|---|---|---|
| 5,657,257 A | * | 8/1997 | Lee ............................... | 713/321 |
| 5,808,881 A | * | 9/1998 | Lee ............................... | 363/37 |
| 5,987,613 A | * | 11/1999 | Busch et al. ................... | 713/300 |
| 6,198,262 B1 | * | 3/2001 | Squibb et al. ................. | 323/273 |
| 6,204,701 B1 | * | 3/2001 | Tsay et al. ..................... | 327/143 |
| 7,631,143 B1 | * | 12/2009 | Niver et al. .................... | 711/114 |
| 8,054,599 B2 | | 11/2011 | Dishman et al. | |
| 8,593,964 B1 | * | 11/2013 | Sinha et al. .................... | 370/235 |
| 2002/0133735 A1 | * | 9/2002 | McKean et al. ................... | 714/5 |
| 2004/0072539 A1 | * | 4/2004 | Monte et al. ................. | 455/13.4 |
| 2006/0082222 A1 | * | 4/2006 | Pincu et al. ..................... | 307/29 |
| 2007/0008670 A1 | * | 1/2007 | Fletcher et al. ................ | 361/62 |
| 2008/0109584 A1 | * | 5/2008 | Kalwitz ........................ | 710/104 |
| 2009/0066527 A1 | * | 3/2009 | Teachman ..................... | 340/657 |
| 2009/0234512 A1 | | 9/2009 | Ewing et al. | |
| 2010/0328849 A1 | | 12/2010 | Ewing et al. | |
| 2011/0157934 A1 | * | 6/2011 | Clemo et al. .................... | 363/71 |
| 2011/0208483 A1 | * | 8/2011 | Dilkina et al. .................... | 703/1 |
| 2012/0113683 A1 | * | 5/2012 | Perisic et al. .................. | 363/17 |
| 2013/0200908 A1 | * | 8/2013 | Huebschman ............ | 324/750.01 |
| 2013/0311017 A1 | * | 11/2013 | Matsunaga et al. ............. | 701/22 |

OTHER PUBLICATIONS

Cisco: Data Center Power and Cooling—White Paper; Aug. 2011 http://www.cisco.com/en/US/solutions/collateral/ns340/ns517/ns224/ns944/white_paper_c.

* cited by examiner

*Primary Examiner* — Thienvu Tran
*Assistant Examiner* — Brian K Baxter
(74) *Attorney, Agent, or Firm* — Hewlett Packard Enterprise Patent Department

(57) ABSTRACT

Fault-tolerant power control in a computer system is described. In an example, a power controller to control power applied to an enclosure having a plurality of computing devices includes: first and second alternating current (AC) primary power meters respectively measuring first and second input power feeds to the enclosure; a first alternative power meter to measuring power supplied by the first input power feed; a second alternative power meter to measure power supplied by the second input power feed; a first controller coupled to the first primary power meter and the second alternative power meter; and a second controller coupled to the second primary power meter and the first alternative power meter; wherein the first controller is coupled to the second controller.

20 Claims, 5 Drawing Sheets

FAULT-TOLERANT POWER CONTROL IN A COMPUTER SYSTEM

BACKGROUND

Managing power consumed by a group of computers, such as an enclosure or rack of servers, requires the ability to measure the power consumption of the entire group. Mission-critical solutions require the ability to measure the power consumption even when any single component fails. The simple solution of controlling power using a single power controller is not fault-tolerant and thus not desirable for use in mission-critical environments.

BRIEF DESCRIPTION OF THE DRAWINGS

Some embodiments of the invention are described with respect to the following figures.

DETAILED DESCRIPTION

Figure 1:
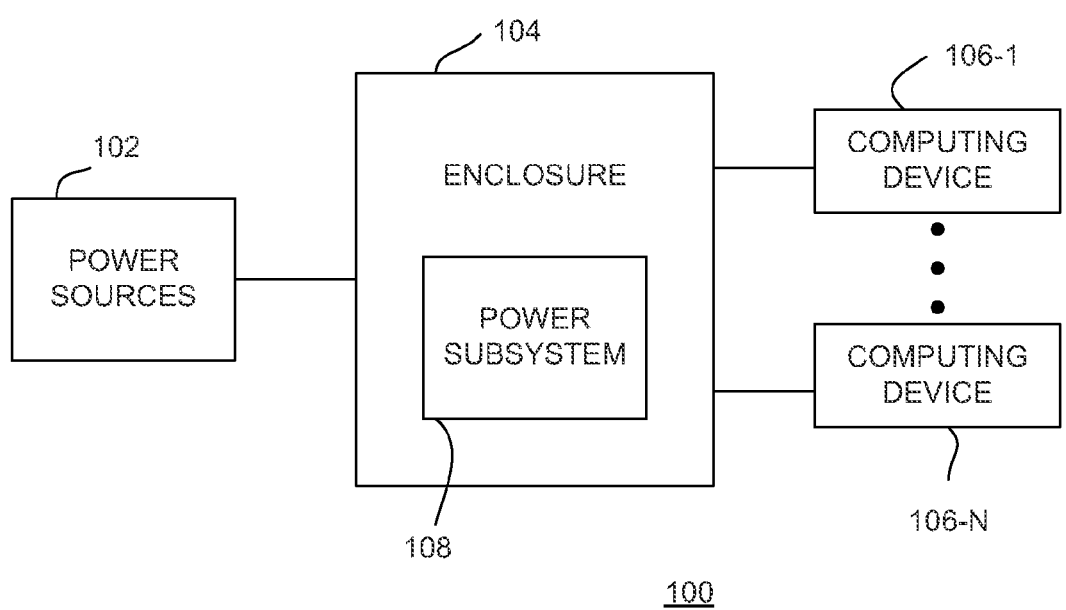
FIG. 1 is a block diagram of a computing system according to an example implementation.

FIG. 1 is a block diagram of a computing system 100 according to an example implementation. The computing system 100 includes an enclosure 104 and a plurality of computing devices 106-1 through 106-N (collectively referred to as "computing devices 106"). The enclosure 104 is coupled to power sources 102 that provide alternating current (AC) power. The computing devices 106 can include any type of device, such as servers, network modules, and the like. The enclosure 104 supplies power to the computing devices 106. The enclosure 104 includes a power subsystem 108. The power subsystem 108 receives AC power from the power sources 102 and provides power (e.g., direct current (DC) power) to the computing devices 106. The power subsystem 108 can provide various power management features, such as group power capping (e.g., limiting the power consumed by the computing devices 106 as a group), multi-zone redundancy, and zone failure.

Figure 2:
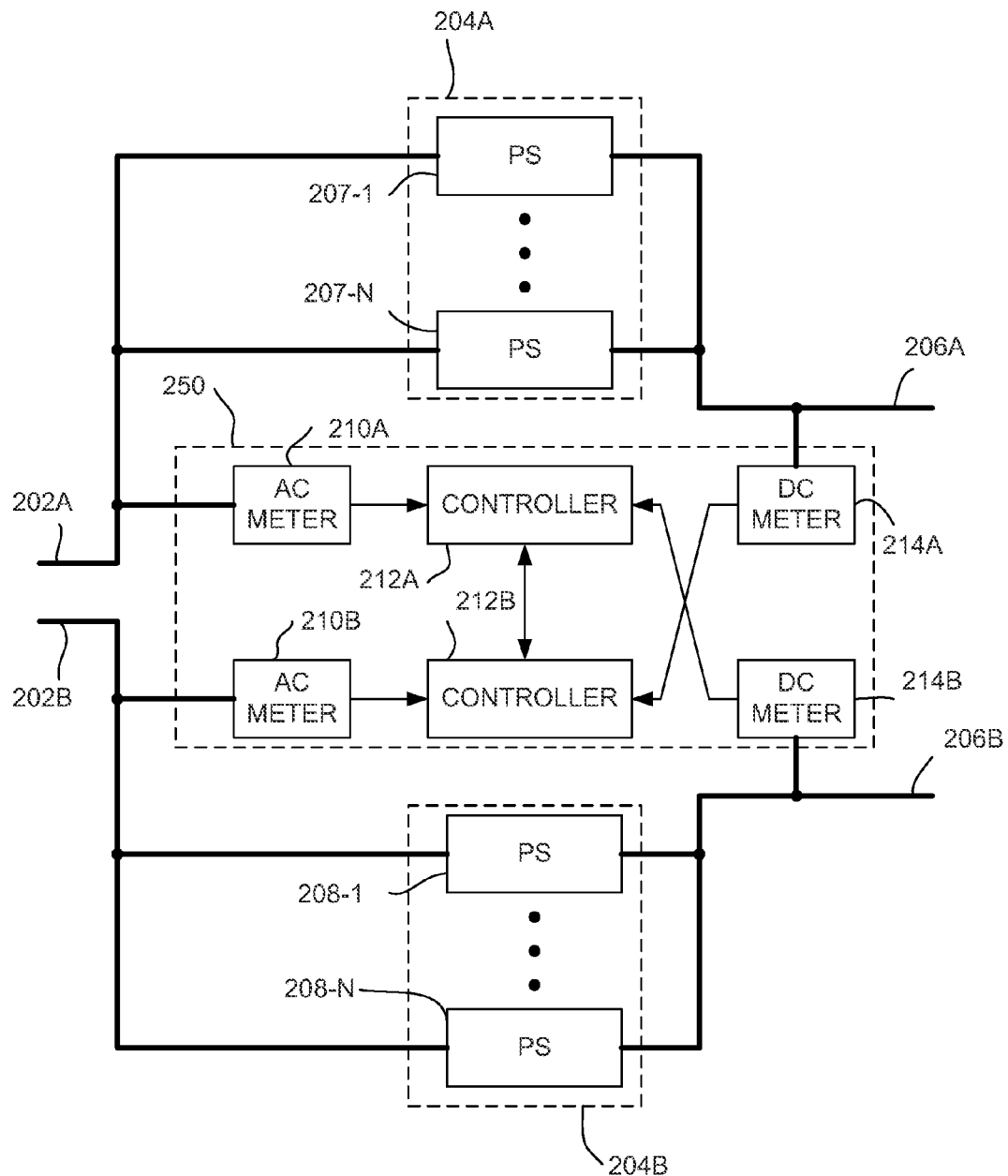
FIG. 2 is a block diagram of a power subsystem according to an example implementation.

FIG. 2 is a block diagram of the power subsystem 108 according to an example implementation. The power subsystem 108 includes AC supply lines 202A and 202B, power supplies 204A and 204B, DC supply lines 206A and 206B, and a power control subsystem 250. The power supply 204A receives AC power from the AC supply line 202A and provides DC power on the DC supply line 206A. Likewise, the power supply 204B receives AC power from the AC supply line 202B and provides DC power on the DC supply line 206B. The power supply 204A can include a plurality of power supply units 207-1 through 207-N (collectively "power supply units 207") connected in parallel. The power supply 204B can include a plurality of power supply units 208-1 through 208-N (collectively "power supply units 208") connected in parallel.

The power control subsystem 250 includes a pair of AC power meters 210A and 210B, a pair of controllers 212A and 212B, and a pair of DC power meters 214A and 214B. Each of the AC power meters 210A and 210B can measure power consumed by the power supplies over time. The AC power meters 210A and 210B provide AC power measurements to the controllers 212A and 212B, respectively. The AC power meters 210A and 210B can provide measurements of AC input power consumed ("AC input power measurements") to the controllers 212A and 212B periodically, continuously, or on demand. The AC power meter 210A takes AC input power measurements from the AC supply line 202A, and the AC power meter 210B takes AC input power measurements from the supply line 202B. The AC power meters 210A and 210B can be coupled to their respective controllers 212A and 212B using a data bus (e.g., an I2C bus or the like).

Each of the DC power meters 214A and 214B can measure DC power provided to the computing systems over time. The DC power meters 214A and 214B provide DC power measurements to the controllers 212B and 212A, respectively. The DC power meters 214A and 214B can provide measurements of DC output power provided ("DC output power measurements") to the controllers 212A and 212B periodically, continuously, or on demand. The DC power meter 214A takes DC output power measurements from the DC supply line 206A, and the DC power meter 214B takes DC output power measurements from the DC supply line 206B. The DC power meters 214A and 214B can be coupled to their respective controllers 212B and 212A using a data bus (e.g., an I2C bus or the like).

The controllers 212A and 212B are coupled to one another by a data bus (e.g., an I2C bus or the like). The controllers 212A and 212B can exchange power measurements with one another. That is, through data exchange, the controller 212A can obtain AC input power measurements from the AC supply line 202B, and/or DC output power measurements from the DC supply line 206A, and the controller 212B can obtain AC input power measurements from the AC supply line 202A, and/or DC output power measurements from the DC supply line 206B.

In the example implementation of FIG. 2, the power subsystem 108 includes two zones (designated Zone A and Zone B). Each zone includes a controller ("zone manager"), an AC meter, and a DC meter. For each zone, the AC meter measures AC input power, and the DC meter measures DC output power. By way of example, the notion of "input power" and "output power" is defined with respect to the power supplies 204A and 204B (AC power input to the supply, DC power output from the supply). For each zone, the AC and DC meters can each supply measures of power consumed. The AC meters 210A and 210B can provide accurate measures of power consumed by taking direct measurements from the input supply lines. The DC meters 214A and 214B provide measures of power output from the supplies 204A and 204B, from which input power can be inferred given parameters of the supplies. Thus, DC meters 214A and 214B can be used to provide measures of input power consumed, which can in some cases be less accurate than the direct measures of the AC meters 210A and 210B. Since the DC meters 214A and 214B can be less accurate than the AC meters 210A and 210B, the DC meters 214A and 214B are used as "backups" to the AC meters 210A and 210B.

Each controller 212A and 212B generally monitors the hardware on half of the enclosure (e.g., the controller 212A monitors Zone A, and the controller 212B monitors Zone B). Through the data exchange discussed above, each controller can have a power view of the entire enclosure (both zones). In an example, one of the controllers 212A or 212B can be assigned as a "primary controller" that controls features applicable to the enclosure as a whole (i.e., both power zones). For example, the primary controller can manage a power capping feature for the attached computing devices as a whole. The primary controller receives data from the secondary controller through the data exchange described above in order to perform the enclosure-wide power feature.

The controllers 212A and 212B can also store parametric data respectively for the power supplies 204A and 204B. The parametric data can include, for example, various power supply characteristics, such as input-versus-output relationships, power factors, and the like. Using the parametric data, a controller 212A or 212B can infer input power given output power measurements. As described below, such inferences of input power can be used during a failover process given particular faults in the power subsystem.

The controllers 212A and 212B can also store failover detection logic to detect faults and implement a failover process. The failover detection logic in a controller can detect a fault in the other controller. In an example, the failover detection logic can detect absence of a signal (e.g., a heartbeat signal) from the other controller and indicate a fault. If a primary controller detects a fault in the secondary controller, the primary controller can begin using the DC output power measurements it receives directly and infer AC input power of the failed zone. If a secondary controller detects a fault in the primary controller, the secondary controller can promote itself to a primary controller and beginning performing the enclosure-wide power control features.

Figure 3:
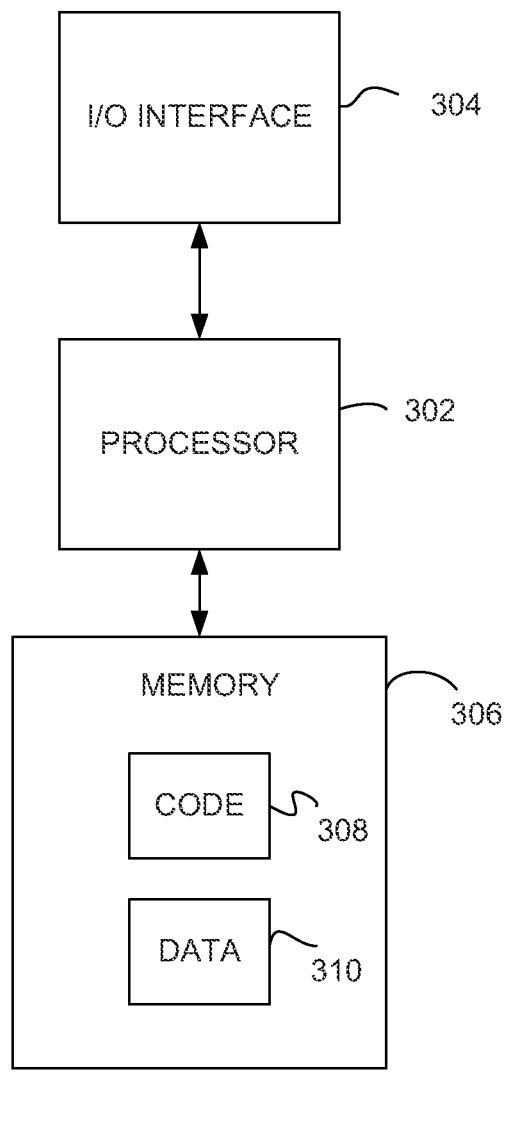
FIG. 3 is a block diagram of a controller according to an example implementation.

FIG. 3 is a block diagram of a controller 300 according to an example implementation. The controller 300 can be used to implement the controllers 212A and 212B shown in FIG. 2. The controller 300 includes a memory 306, a processor 302, and an input/output (IO) interface 304. The processor 302 can include any type of microprocessor, microcontroller, or the like known in the art. The memory 306 can include random access memory, read only memory, cache memory, magnetic read/write memory, or the like or any combination of such memory devices. The IO interface 304 can provide busses, bridges, and the like to facilitate communication with the components of the controller 300.

The memory 306 can store code 308 executable by the processor 302 to perform various methods of power management described herein. For example, the code 308 can provide logic for exchanging power measurements between controllers, implementing various power management functions (e.g., power capping), implementing failover detection logic, and the like. The memory 306 can also store data 310 for use by the methods of power management described herein. For example, the data 310 can include parametric data for the power supplies that can be used to infer input power from output power.

Figure 4:
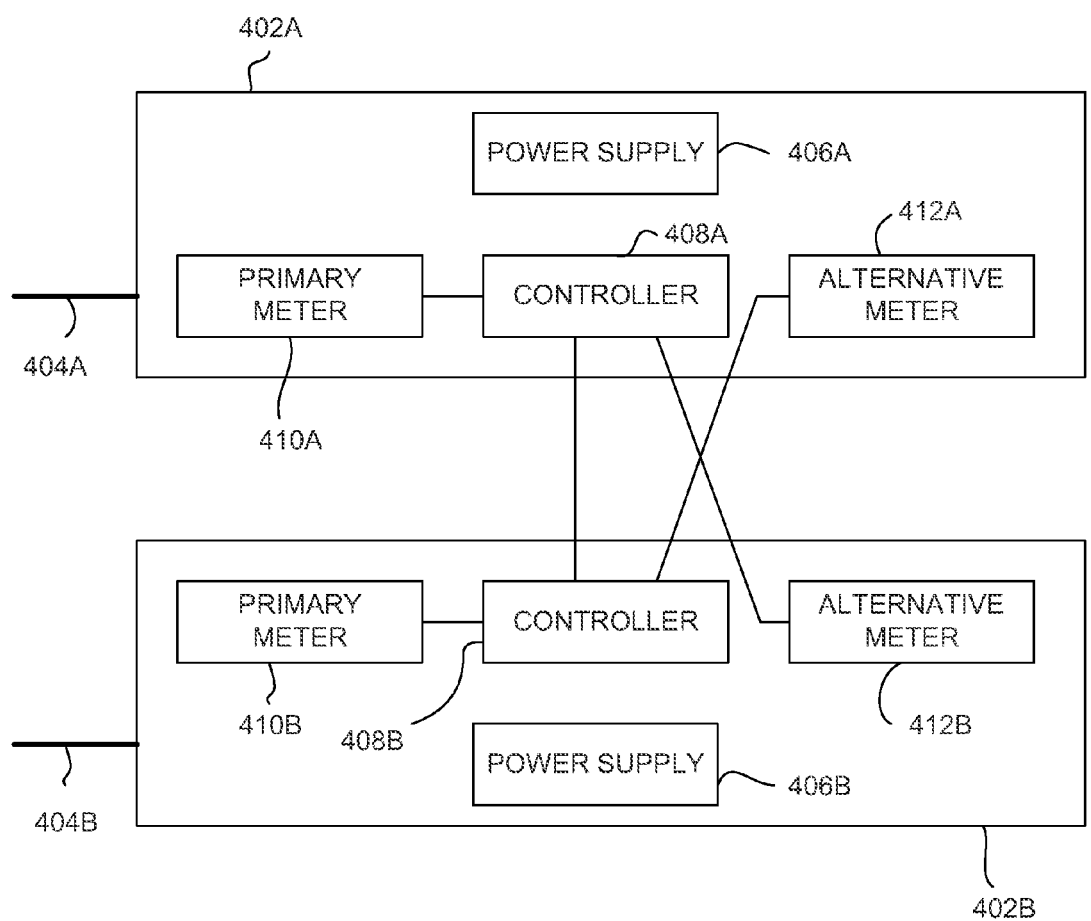
FIG. 4 is a block diagram of a power subsystem according to another example implementation.

FIG. 4 is a block diagram of the power subsystem 108 according to another example implementation. The power subsystem 108 includes a power zone 402A and a power zone 402B. The power zone 402A is coupled to a supply line 404A and includes a power supply 406A, a controller 408A, a primary power meter 410A, and an alternative power meter 412A. The power zone 402B is coupled to a supply line 404B and includes a power supply 406B, a controller 408B, a primary power meter 410B, and an alternative power meter 412B.

The primary power meters 410A and 410B respectively meter the supply lines 404A and 404B (i.e., input power feeds). The alternative power meter 412A meters power supplied by the supply line 404A, and the alternative power meter 412B meters power supplied by the supply line 404B. In an example implementation, the primary power meters 410A and 410B can measure power more accurately than the alternative power meters 412A and 412B. Thus, the alternative power meters 412A and 412B can be cheaper in terms of cost than the primary power meters 410A and 410B.

The controller 408A is coupled to the primary power meter 410A and the alternative power meters 412B. The controller 408B is coupled to the primary power meter 410E and the alternative power meter 412A. The controller 408A can be coupled to the controller 408B. The controllers 408A and 408B can exchange measures of power and/or other control signals (e.g., heartbeat signals) through their connection.

In an example implementation, the primary power meters 410A and 410B are AC power meters that measure AC power supplied by the supply lines 404A and 404B, respectively. The alternative power meters 412A and 412B are DC power meters that measure DC power output from the power supplies 406A and 406B, respectively. In such implementation, the power subsystem 108 operates as described above in FIG. 2.

In another example implementation, the alternative power meters 412A and 412B are also AC power meters that measure AC power supplied by the supply lines 404A and 404B, respectively. In such implementation, the power subsystem 108 operates similarly as described above, except that the controllers 408A and 408B do not have to infer input power from DC output power. Thus, the controllers 408A and 408B do not need to be configured with parametric data of the power supplies 406A and 406B.

Figure 5:
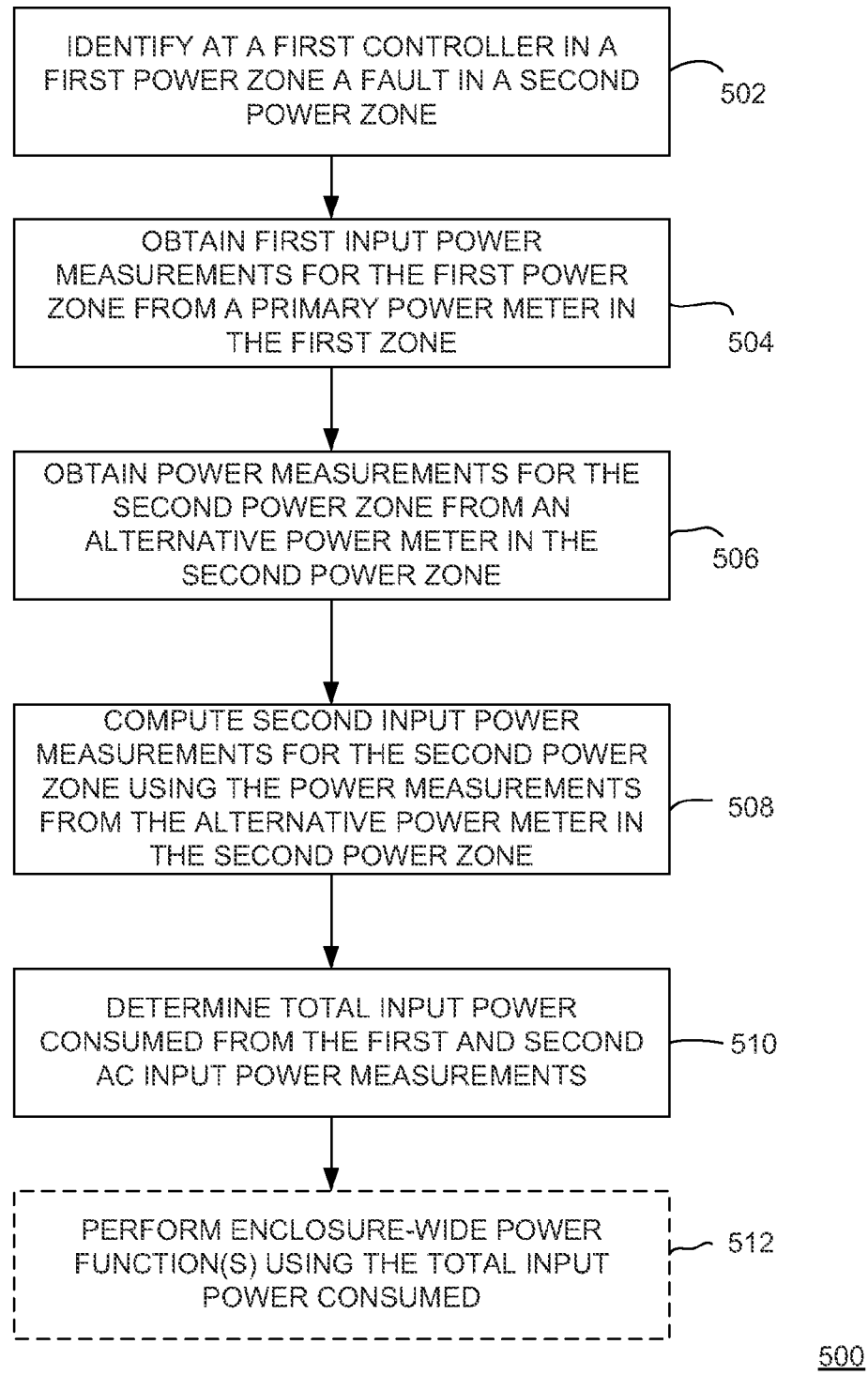
FIG. 5 is a flow diagram depicting a method of controlling power applied to an enclosure having a plurality of computing devices according to an example implementation.

FIG. 5 is a flow diagram depicting a method 500 of controlling power applied to an enclosure having a plurality of computing devices according to an example implementation. The method 500 can be understood with simultaneous reference to FIG. 4. The method 500 begins at step 502, a first controller in a first power zone identifies a fault in a second power zone. For example, a second controller in the second power zone may have failed, a meter in the second zone may have failed, etc. The fault can be determined by detecting absences of a signal from the second controller (e.g., a heartbeat signal).

At step 504, the first controller obtains first input power measurements for the first power zone from a primary power meter in the first zone. At step 506, the controller obtains power measurements for the second power zone from an alternative power meter in the second power zone. At step 508, the controller computes second input power measurements for the second power zone using the power measurements from the alternative power meter in the second power zone. At step 510, the controller can determine total input power consumed from the first and second input power measurements. At step 512, the controller can use total input power consumed in various enclosure-wide power control functions, such as global power capping for the attached computing devices.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A power controller to control power applied to an enclosure having a plurality of computing devices, comprising:

first and second primary power meters respectively measuring first and second input power feeds to the enclosure;
a first alternative power meter to measure power supplied by the first input power feed;
a second alternative power meter to measure power supplied by the second input power feed;
a first controller coupled to the first primary power meter and the second alternative power meter; and
a second controller coupled to the second primary power meter and the first alternative power meter;
wherein the first controller is coupled to the second controller.

2. The power controller of claim 1, wherein the first controller sends measures of power from the first primary power meter to the second controller, and wherein the second controller sends measures of power from the second primary power meter to the first controller.

3. The power controller of claim 2, wherein the first and second primary power meters are respectively first and second alternating current (AC) power meters, and wherein the first and second alternative power meters are respectively first and second direct current (DC) power meters coupled to respective output power feeds provided by first and second power supplies driven by the respective first and second input power feeds.

4. The power controller of claim 3, wherein the first or second controller stores parametric data for the second or first power supply, respectively.

5. The power controller of claim 1, wherein the first or second controller includes failover detection logic to detect absence of a signal provided by the other of the first or second controller.

6. The power controller of claim 4, wherein:
the first controller, in response to detection of a failure at the second controller, determines a measure of total input power to the enclosure by adding a measure of input power provided by the first AC power meter and a measure of input power inferred using a measure of output power from the second DC power meter.

7. The power controller of claim 1, wherein:
the first controller, in response to detection of a failure at the second controller, determines a measure of total input power to the enclosure by combining a measure of input power provided by the first primary power meter and a measure of input power provided by the second alternative power meter.

8. The power controller of claim 1, wherein the first power supply and the second power supply each include a plurality of power supply units in parallel.

9. A method of controlling power applied to an enclosure having a plurality of computing devices, comprising:
identifying, at a first controller of a first power zone, a fault in a second power zone;
obtaining first input power measurements for the first power zone from a primary power meter in the first power zone;
obtaining power measurements for the second power zone from an alternative power meter in the second power zone;
computing second input power measurements for the second power zone using the power measurements from the alternative power meter in the second power zone; and
computing total input power consumed from the first and second input power measurements.

10. The method of claim 9, wherein the step of identifying includes:
determining absence of a signal from a second controller in the second power zone.

11. The method of claim 9, further comprising:
performing a power function for all of the computing devices in the enclosure as a group using the total input power consumed.

12. The method of claim 9, wherein the primary power meter is an alternating current (AC) power meter, and wherein the alternative power meter is a direct current (DC) power meter coupled to an output power feed of a power supply in the second power zone.

13. The method of claim 12, wherein the second input power measurements are computed for the second power zone by using the power measurements from the DC power meter and parametric data for the power supply in the second power zone.

14. An enclosure for a plurality of computing devices, comprising:
a power subsystem to manage power for the computing devices attached to the enclosure, the power subsystem including:
a first power zone having a first primary power meter measuring a first input power feed, a first alternative power meter measuring power supplied by the first input power feed, and a first controller;
a second power zone having a second primary power meter measuring a second input power feed, a second alternative power meter measuring power supplied by the second input power feed, and a second controller;
wherein the first controller receives measurements from the first primary power meter, and the second alternative power meter; and
wherein the second controller receives measurements from the second primary power meter, and the first alternative power meter.

15. The enclosure of claim 14, wherein the first controller sends measures of power from the first primary power meter to the second controller, and wherein the second controller sends measures of power from the second primary power meter to the first controller.

16. The enclosure of claim 15, wherein the first and second primary power meters are respectively first and second alternating current (AC) power meters, and wherein the first and second alternative power meters are respectively first and second direct current (DC) power meters coupled to respective output power feeds provided by first and second power supplies driven by the respective first and second input power feeds.

17. The enclosure of claim 16, wherein the first or second controller stores parametric data for the second or first power supply, respectively.

18. The enclosure of claim 14, wherein the first or second controller includes failover detection logic to detect absence of a signal provided by the other of the first or second controller.

19. The enclosure of claim 14, wherein:
the first controller, in response to detection of a failure at the second controller, determines a measure of total input power to the enclosure by combining a measure of input power provided by the first AC power meter and a measure of input power provided by the second alternative power meter.

20. The enclosure of claim 14, wherein the first power supply and the second power supply each include a plurality of power supply units in parallel.

* * * * *